United States Patent [19]

Wenner

[11] 4,414,591

[45] Nov. 8, 1983

[54] DUAL ACCESS FLEXIBLE DISK DRIVE

[75] Inventor: John W. Wenner, Tucson, Ariz.

[73] Assignee: International Business Machines Corporation, Armonk, N.Y.

[21] Appl. No.: 160,756

[22] Filed: Jun. 18, 1980

[51] Int. Cl.³ .................. G11B 5/016; G11B 5/54; G11B 21/22; G11B 23/02
[52] U.S. Cl. .................. 360/99; 360/105; 360/133
[58] Field of Search .......... 360/97, 99, 105, 106, 360/133; 206/444

[56] References Cited

U.S. PATENT DOCUMENTS

| 3,815,150 | 6/1974 | Stoddard et al. | 360/99 |
| 4,001,888 | 1/1977 | Morgan | 360/99 |
| 4,146,912 | 3/1979 | Kukreja | 360/99 |
| 4,159,494 | 6/1979 | Evans et al. | 360/133 |
| 4,185,314 | 1/1980 | Hatchett et al. | 206/444 |

FOREIGN PATENT DOCUMENTS 54-156615 12/1979 Japan .

*Primary Examiner*—Robert S. Tupper
*Attorney, Agent, or Firm*—Walter J. Madden, Jr.

[57] ABSTRACT

A drive is provided which accepts a cartridge containing a flexible magnetic recording disk and provides for simultaneous transducer access to both recording surfaces of the disk. The cartridge is inserted into a tray in the drive and then rotated in the tray to position both recording surfaces adjacent transducers and to position the disk center on a disk drive member for rotating the disk.

8 Claims, 9 Drawing Figures

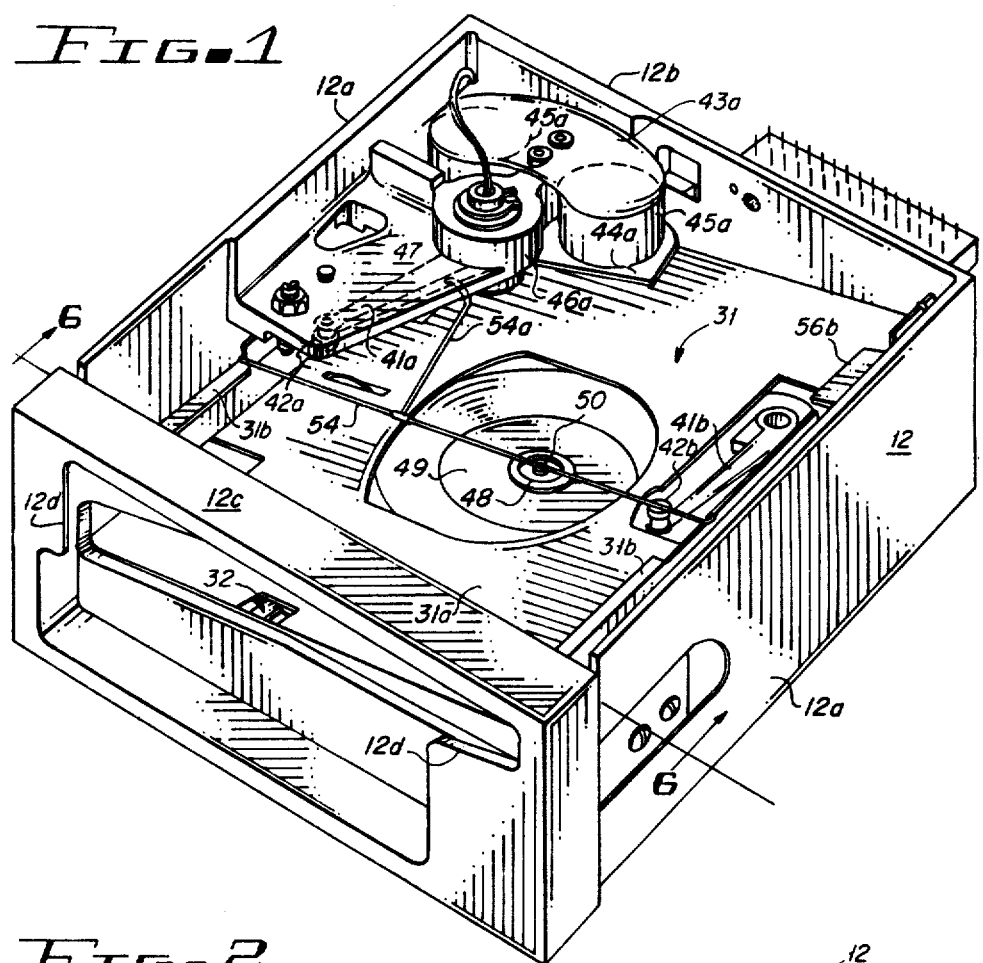
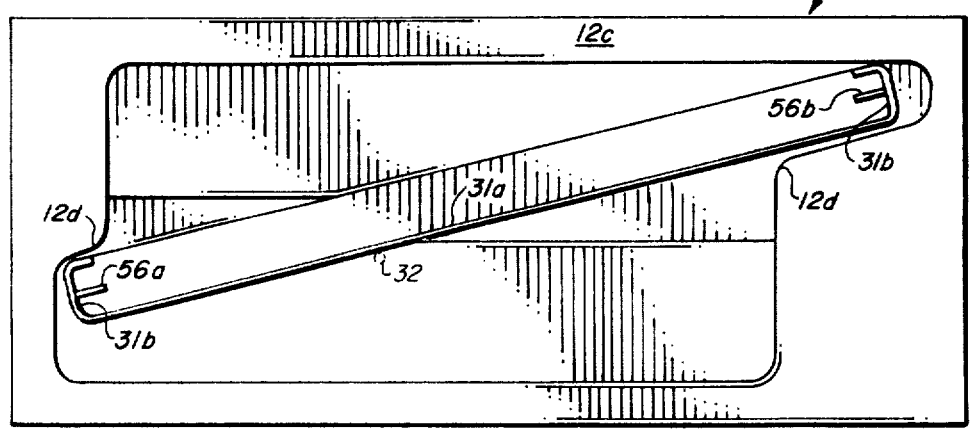

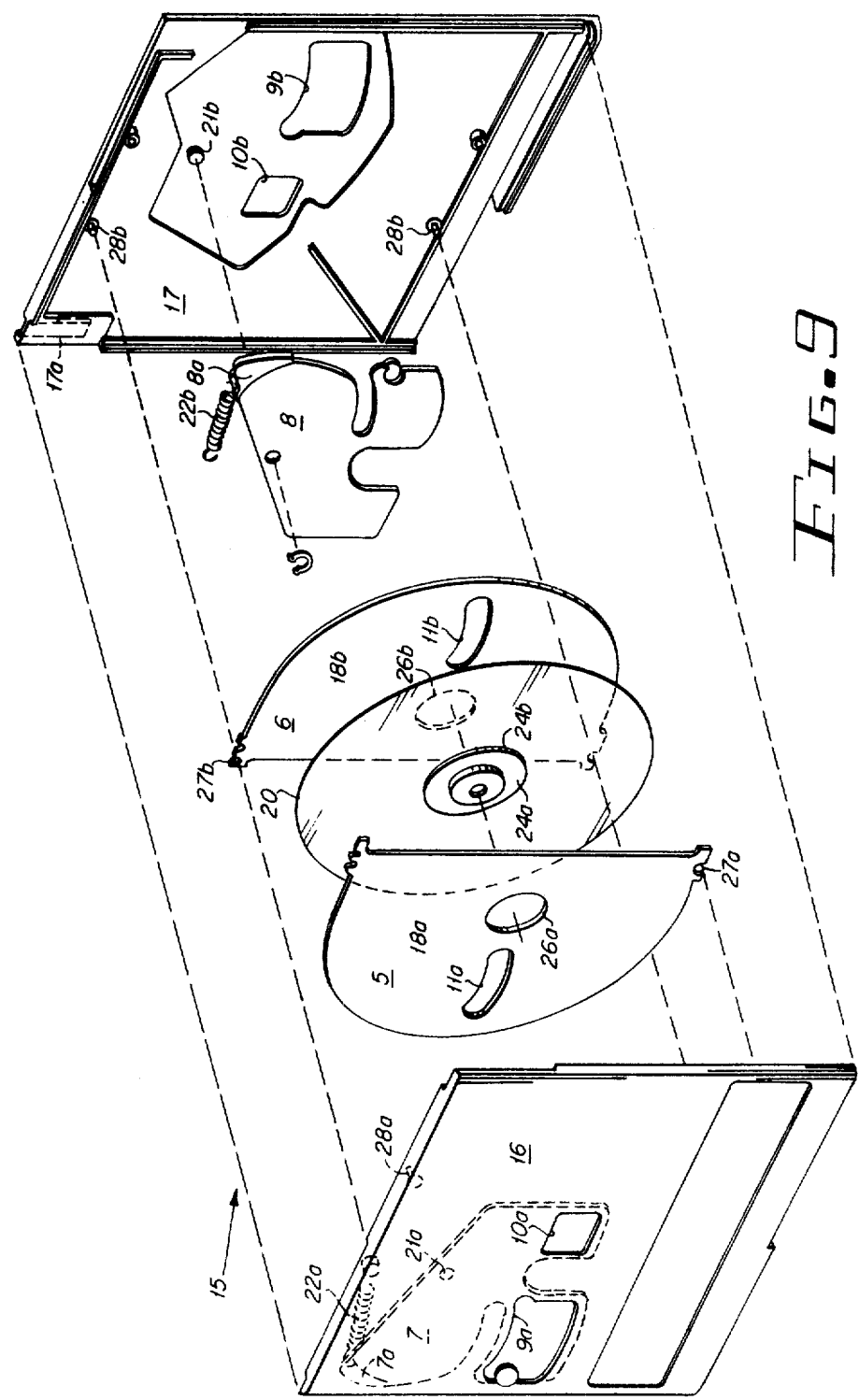

DUAL ACCESS FLEXIBLE DISK DRIVE

TECHNICAL FIELD

This invention relates to data storage apparatus employing a flexible record disk mounted in a cartridge, and relates more particularly to drive apparatus for utilizing such a cartridge to permit simultaneous access to both record surfaces of the disk.

BACKGROUND ART

In the field of magnetic recording on removable flexible disks mounted in cartridges, it would be desirable to be able to position the disk so as to permit simultaneous access to both recording surfaces of the disk by magnetic transducers for magnetically cooperating with the disk record surfaces. Heretofore, even though dual-sided flexible recording disks mounted in cartridges were known in the art, there was no practical way to insert such cartridges into a disk drive to permit simultaneous access to both of the disk recording surfaces. Instead, it was necessary to insert the cartridge into the drive for recording or reproducing on one side, then remove the cartridge and reverse it for re-insertion in the drive to obtain access to the other recording surface. This situation was caused by the fact that there had been no practicl way to load two transducers against both surfaces of the disk in an insertable type cartridge.

In the prior diskette art, there are flexible disk drives which provide access to both sides of the disk, with the magnetic transducers operating in contact with the disk surfaces. However, this "contact" mode of operation is totally different from, and inapplicable to, flexible disks in a cartridge where the disk and transducer operate in a Bernoulli and air-bearing mode without contact between disk and transducer.

PRIOR ART

U.S. Pat. No. 4,159,494 discloses a cartridge having non-planar Bernoulli surfaces for each of the recording disk surfaces so that both sides of the disk may be used by inserting the cartridge in a drive spindle in either of two positions.

U.S. Pat. No. 3,815,150 discloses a disk drive for a flexible disk cartridge wherein the cartridge is loaded onto the drive spindle by first placing it in a holder without touching either the recording head or drive spindle. The holder is pivotable between a loading and an operating position. However, it has no provision for dual-sided access.

SUMMARY OF THE INVENTION

In accordance with the present invention, a drive mechanism receives a cartridge which contains a dual-sided flexible magnetic disk and provides simultaneous access to both surfaces of the disk by magnetic transducers mounted in the drive. The drive contains an upper transducer and a lower transducer, and the cartridge is inserted in the drive between the two transducers. The cartridge is cocked or tilted from the horizontal as it is inserted, and after it is fully inserted, the cartridge is rotated to a horizontal position. By means of a novel spring mechanism in the drive, rotation of the cartridge to the horizontal position causes the cartridge to be placed against, and held in proximity to, the two transducers. Removal of the cartridge is accomplished by the reverse action of rotating it to the cocked position, then withdrawing it from the drive.

Preferably, the cartridge used with the drive has shutter mechanisms which cover transducer access openings and central disk drive openings when the cartridge is not mounted in a drive. When the cartridge is inserted into the drive, a mechanism in the drive automatically moves the shutter mechanism to open the transducer openings and the central drive openings so that these openings are ready to receive the transducers and the disk drive mechanism in operative relationship when the cartridge is rotated to the horizontal or operating position.

BRIEF DESCRIPTION OF THE DRAWINGS

FIG. 1 is a perspective view of a flexible disk drive in accordance with the present invention;

FIG. 2 is a view of the front of the device of FIG. 1;

FIG. 9 is an exploded perspective view of a cartridge useful with the present invention.

DESCRIPTION OF THE BEST MODE AND INDUSTRIAL APPLICABILITY

Figure 3:
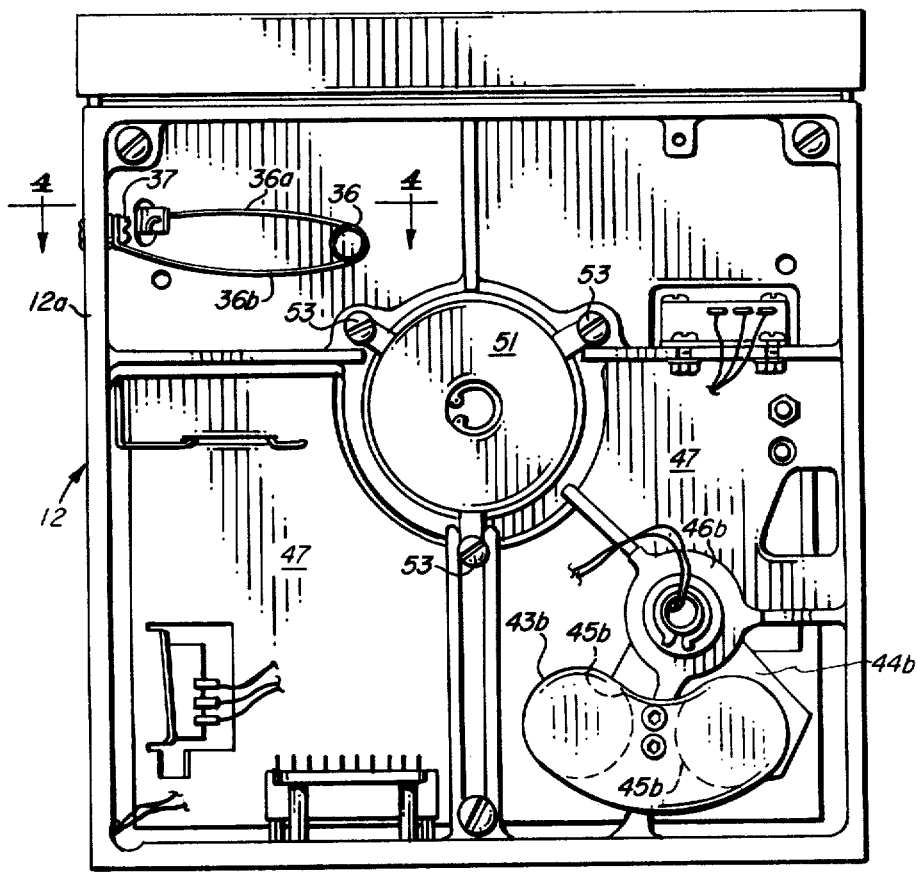
FIG. 3 is a bottom view of the device of FIG. 1, illustrating the location of the loading spring mechanism.

Referring to FIG. 1, a drive in accordance with the present invention includes a housing 12 having side wall 12a, a rear wall 12b and a front member 12c, having ears 12d. Front member 12c is provided with a rectangular opening as shown for receiving a cartridge to be mounted in the drive. The cartridge employed may be of any suitable type, but preferably it is of the type described in my copending application Ser. No. 160,755, filed June 18, 1980, assigned to the same assignee as the present application. Such a cartridge 15 is shown in perspective in FIG. 9 and includes a pair of mating cover members 16, 17 which enclose a flexible magnetic recording disk 20. Cartridge 15 also preferably encloses a pair of Bernoulli half plates 5, 6 which are disposed on opposite sides of disk 20 and which act to aerodynamically stabilize flexible disk 20, as described in detail in my copending application, Ser. No. 160,757, filed June 18, 1980, now abandoned, assigned to the same assignee as the present application. Cover members 16, 17 are identical in configuration to each other, as are Bernoulli plates 5, 6, so as to reduce their fabrication and stocking costs. One small difference between members 16, 17 may be the provision of a slot 17a in member 17. The presence or absence of this slot may be sensed by microswitch means in the drive in which the cartridge is mounted to determine which side of disk 20 is adjacent the transducing means when the cartridge is mounted in a drive having only a single transducing means.

The hub which couples the flexible disk to a rotary power source is made up of two identical steel stampings 24a, 24b which are assembled back-to-back to form a hub which is side-to-side symmetrical. Flexible disk 20 is secured to this hub structure by means of an adhesive ring adhering to the flexible disk and to one side of the disk hub outer collar. The resulting cartridge structure has a symmetry which permits use of the cartridge with either side 16 or 17 up.

Cover members 16, 17 are each provided with shutter mechanisms 7, 8 respectively, which cover transducer openings 9a and 9b and central drive openings 10a, 10b in the cover members when the cartridge is not in use on a drive. Shutters 7, 8 are pivoted on their respective cover members at 21a, 21b, respectively, and are urged to their closed positions by springs 22a, 22b (FIG. 1). Each shutter has a lug portion 7a, 8a which engages a part of the cartridge drive when the cartridge is inserted therein to automatically open the shutters and expose the transducer openings and the drive openings in the cartridge, in a manner to be described more fully below. Bernoulli plates 5, 6 each have transducer openings 11a, 12a and central drive openings 26a, 26b through which transducing means may protrude for magnetically recording or reproducing from the recording surfaces of disk 20. Plates 5, 6 preferably have notches 27a, 27b therein which engage pins or studs 28a, 28b in cover members 16, 17 to accurately position the plates in the cartridge.

Figure 6:
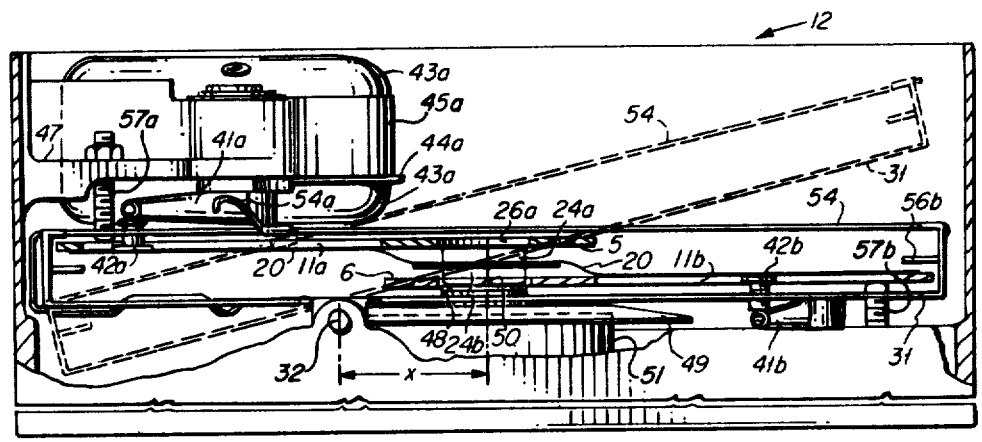
FIG. 6 is a sectional view along plane 6—6 of FIG. 1.

Referring again to FIGS. 1 and 2, the drive device includes a pivotable tray member 31 into which cartridge 15 is inserted for mounting in the drive. Tray 31 has a bottom portion 31a and side walls 31b, the latter having overhanging portions as shown in FIG. 2 to assist in guiding and retaining cartridge 15 as it is inserted into tray 31. Bottom portion 31a has a central opening therein, as seen in FIG. 1, through which drive means extend when the tray is in the loaded position to provide a rotative force to disk 20, as will be described below. Tray 31 is pivoted on front and back pivot members 32 (FIGS. 1 and 6) mounted on the drive frame. Pivot 32 is offset horizontally from the centerline 33 of the disk drive mechanism by an amount X. This pivot offset permits the cartridge and disk to be centered on the disk drive mechanism centerline when the cartridge is rotated into operating position. After insertion, cartridge 15 is pivotable in tray 31 about pivot 32 from the inserted position, shown in dotted outline in FIG. 6, to the operating or loaded position shown in solid lines in FIG. 6, in which the disk hub 24a or 24b engages disk drive means, and transducers are positioned in operative relationship to both sides of disk 20, as will be described more in detail below. For purposes of clarity, only disk 20, plates 5, 6 and hub 24 are shown in FIG. 6, without members 16, 17 and shutters 7, 8.

Figure 4:
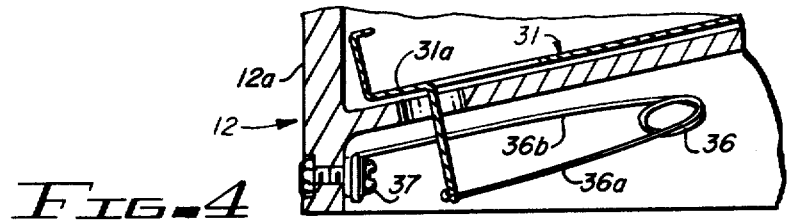
FIG. 4 is a sectional view along plane 4—4 of FIG. 3, illustrating the loading spring in the unloaded position.
Figure 5:
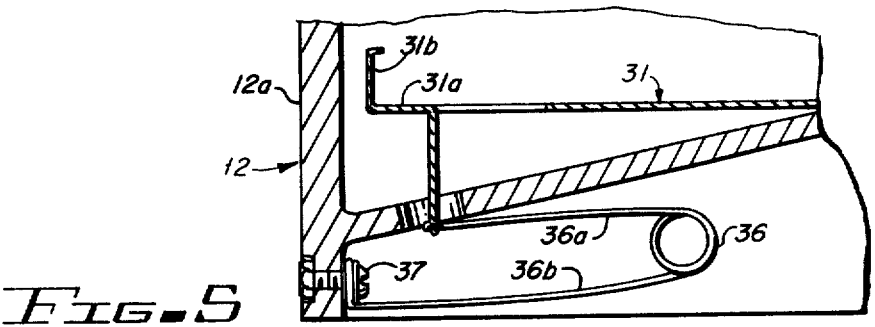
FIG. 5 illustrates the loading spring in the loaded position.

FIGS. 3-5 illustrate the novel spring arrangement of this invention which provides a loading force when tray 31 is rotated to load the cartridge in operating position. The spring preferably is an over-center spring 36 having one leg 36a connected to an extension of tray bottom portion 31a, and having another leg 36b rotatably secured to the wall 12a of housing 12 by a shoulder screw 37. Prior to loading, tray 31 and spring 36 are in the position shown in FIG. 4. As tray 31 is rotated clockwise to load the cartridge, spring leg 36b rotates under shoulder screw 37 to reach the position shown in FIG. 5, with spring 36 providing a strong, positive loading force to load cartridge 15 in operating position. This maximum loading force is developed with minimal space requirements for the spring, thereby reducing the overall drive height, which is an important space consideration in small, low-cost files.

Referring again to FIG. 1, the drive includes a pair of transducing arm 41a, 41b carrying transducers 42a, 42b at the ends thereof which magnetically cooperate with the recording surfaces of disk 20 when the cartridge is in operative position. Lower transducer arm 41b extends through an opening in bottom portion 31a of tray 31 so as to position transducer 42b adjacent the lower surface of disk 20 when the cartridge is in the loaded position. Arms 41a, 41b are each part of respective rotary actuators which provide rotary motion to the associated arms to cause transducers 42a, 42b to be controllably positioned adjacent different concentric tracks on the surfaces of disk 20, as is well known in the art. The rotary actuator contains a voice coil motor structure in which a movable armature coil is positioned in a magnetic field, and variations in the armature coil current produce movement of the coil and the transducer arms and transducers. In the structure shown in FIG. 1, the armature coil for the upper actuator is in the form of a flat member 44a positioned in the magnetic field gap between an assembly of two magnets and two flux return paths. Armature coil 44a is directly connected to transducer arm 41a through a bearing member 46a mounted in casting 47 secured to walls of the drive. The magnets are preferably circular in configuration, as shown by magnets 45a for the upper actuator in FIG. 1 and magnets 45b for the lower actuator shown in FIG. 3. Magnets 45a, 45b are covered by upper and lower flux return path members 43a, 43b respectively, and these two flux return path members have rounded corners at both top and bottom, as best seen in FIGS. 1 and 6, to reduce the possibility of stray flux from the magnets affecting the recorded information on disk 20.

The actuator magnet assembly shown has shorter, lower reluctance return paths, and is designed to use low cost standard catalog magnets. Unlike a conventional two magnet assembly with two "C" shaped return paths, the same return paths are used for both magnets, with cost and space savings. By directly attaching the armature coil to the transducer arm, drive shaft torsional resonance is eliminated and the frequency response of the actuator is increased. In addition, the direct attachment to the arm also eliminates parts and therefore reduces cost and provides added reliability. The resulting actuator is much smaller than those used in the prior art and allows the drive to meet minimum space requirements. Comparable elements are provided for moving transducer 42b and transducer arm 41b, (FIG. 1) including magnets 45b, flux return path members 43b. armature coil 44b, and bearing member 46b journalled in casting 47 (FIG. 3).

When cartridge 15 is in the loaded position shown in solid lines in FIG. 6, the lower hub 24b in disk 20 engages a magnetic clutch mechanism 48 to magnetically couple the hub and flexible disk to a drive member for rotating the magnetic disk. A centering pin 50 which is an extension of the drive motor shaft extends through the opening in the bottom portion 31a of tray 31 to engage an opening in the disk hub when the tray and cartridge are in the operating position. By centering the disk hub on an extension of the drive motor shaft, alignment of the drive motor shaft and the disk axis of rotation are accomplished. The disk drive mechanism also includes a magnetic clutch flywheel 49 (FIG. 1) which is connected to the drive motor shaft.

The motor 51 which supplies the driving force to the disk through clutch 48 extends into the assembly (FIG. 6) to reduce the overall height of the drive. This is accomplished by recessing motor 51 in flywheel 49 as shown in FIG. 6. The motor 51 is mounted on casting 47 (FIG. 3) by means of screws 53, resulting in maximum heat transfer from the motor and minimum height requirements for motor mounting.

As best seen in FIG. 1, tray 31 includes a spring wire member 54 extending across tray 31 and serving to guide and restrain cartridge 15 as it is inserted into the tray. Also provided is a spring member 54a connected to member 54 whose function is to hold upper transducer arm 41a pivoted out of the way of cartridge 15 as it is inserted into the tray. When tray 31 is rotated to load cartridge 15, spring member 54a moves with this rotation releasing upper arm 41a to permit arm 41a to freely rotate under the influence of the rotary actuator to be positioned adjacent the transducer opening 9a in cartridge 15 (FIG. 9). This is an important feature in reducing the overall height of the drive, since without this pivoting of arm 41a during cartridge insertion, additional height would have to be provided in the drive to permit the cartridge to clear arm 41a during insertion.

Figure 7:
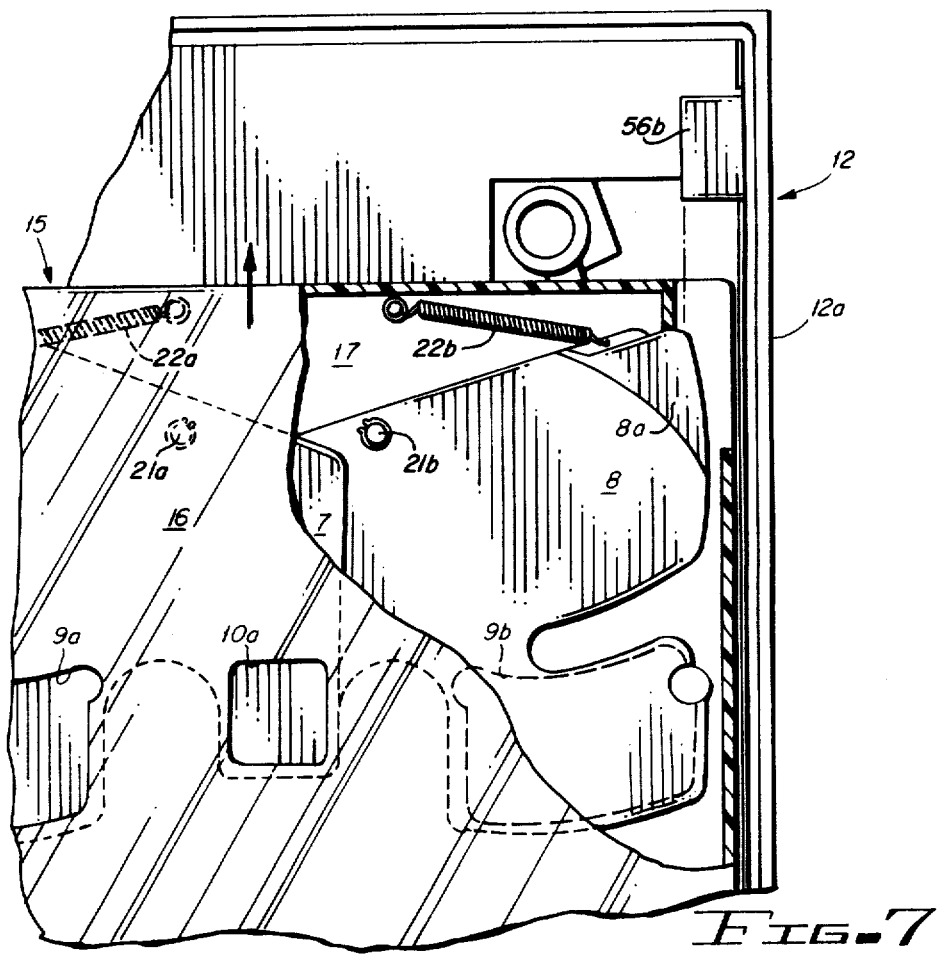
FIG. 7 is a partial plan view illustrating the insertion of a cartridge into the drive.
Figure 8:
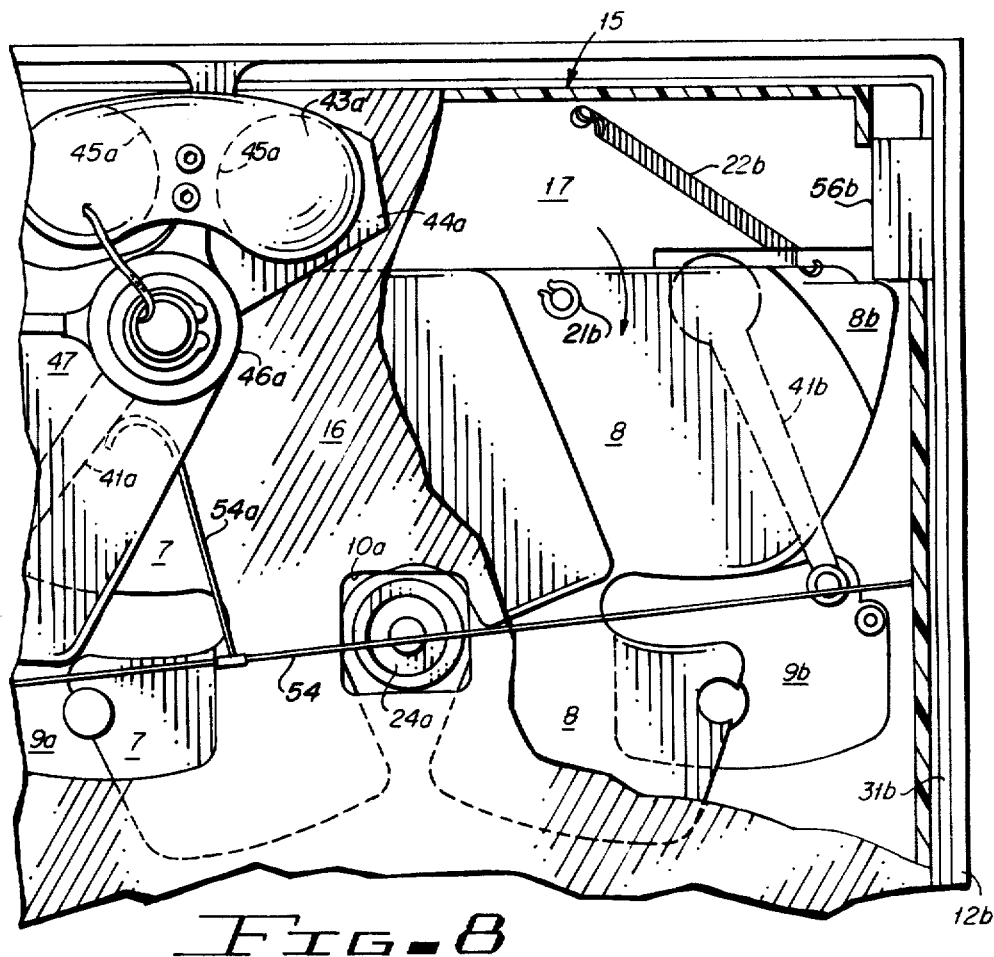
FIG. 8 is similar to FIG. 7, and illustrates the opening of the shutter mechanisms in the cartridge by insertion into the drive.

The operation of the drive device of the present invention to open shutter mechanisms 7, 8 in cartridge 15 (FIG. 9) as the cartridge is inserted in the drive is best illustrated in FIGS. 7 and 8. In FIG. 7, cartridge 15 is being inserted into tray 31, as described above, but is not fully inserted and has not reached the position of tabs 56a, 56b in tray 31. In the position shown in FIG. 7, springs 22a, 22b retain shutters 7, 8 in the closed position to cover the transducer and drive openings.

In the position shown in FIG. 8, cartridge 15 has been further inserted into tray 31 so that the lug portions 7a, 8a of the shutters contact tabs 56a, 56b. This action causes shutter 8 to rotate in a clockwise direction against the action of spring 22b, and also causes shutter 7 to rotate in counter-clockwise direction against the action of spring 22a, to thereby open transducer openings 9a, 9b and central drive openings 10a, 10b in the cartridge cover members 16, 17. When the cartridge is fully inserted, the shutters have completely uncovered the transducer openings and drive openings so that the cartridge may be used as described above for magnetically recording or reproducing on the rotating flexible disk 20. Ears 12d on front member 12c insure that the cartridge and tray can not be rotated until the cartridge is fully inserted.

An additional feature of the drive of this invention is the use of locating pins in the drive to accurately locate Bernoulli plates 5, 6 and disk 20 relative to the read/write assembly represented by the transducers 42a, 42b on arms 41a, 41b. This is accomplished as follows: Initial location is provided by inserting and rotating the cartridge 15 in tray 31. Shutter springs 22a, 22b load the front of the cartridge against the back of the front bezel ears 12d to provide rough location in the in and out direction. As the cartridge rotates to its final position, locating pins 57a, 57b (FIG. 6) on top and bottom near the center of each edge, pick up the cartridge as it rotates. The end of each pin 57a, 57b has a small flat surrounded by a taper. This taper picks up the cartridge in its rough location and directs the mating taper in the cartridge wall opening to a precise location centered on the pin centerline, both top and bottom.

These two pins 57a, 57b determine a line of location and as the respective tapers are seated, this becomes a plane which is rough guided by the tray. The pin flats project through small holes at the root of the tapers and pick up the back side of the Bernoulli plates 5, 6 near the outside end of the slot provided in each plate for movement of the transducers and stabilizer. The pin flats have been previously located with respect to the transducer assemblies and therefore accurately locate Bernoulli plates 5, 6 and disk 20 (FIG. 6) with respect to the transducer assemblies.

From the foregoing, it will be seen that there is provided a drive mechanism for a flexible disk cartridge which permits access to both surfaces of the flexible disk at the same time. If the drive is provided with dual sets or read/write electronics, reading or writing can occur simultaneously on both surfaces of disk 20. If only one set of read/write electronics is provided in the drive, reading or writing may take place on one surface of disk 20 while a transducer accessing motion is occurring on the other disk surface.

I claim:

1. A device for mounting a cartridge containing a flexible magnetic recording disk therein, comprising
    drive means in said device for providing rotational motion to said disk;
    a pair of transducing means in said device for simultaneously magnetically cooperating with both magnetic recording surfaces of said disk in a non-contact mode;
    tray means pivotably mounted in said device, said tray means being adapted to receive said cartridge when said tray means is in a first position which is tilted from the horizontal, said tray means being pivotable about an axis which is offset horizontally from the centerline of said drive means to a second horizontal position after insertion of said cartridge therein to position both surfaces of said disk adjacent said transducing means and position a central portion of said disk adjacent said drive means.

2. Apparatus in accordance with claim 1, in which said drive means has an axis of rotation;
    said tray means being pivotable about a pivot axis which is offset from said axis of rotation, whereby the center of said disk is positioned on said axis of rotation when said tray is pivoted to said second position.

3. Apparatus in accordance with claim 1, including over-center spring means connected to said tray means and to the frame of said device for providing a maximum loading force to said cartridge when said tray is pivoted to said second position.

4. Apparatus in accordance with claim 1, including ear means in said device to present pivoting of said tray and said cartridge until said cartridge is fully inserted in said tray.

5. Apparatus in accordance with claim 1, in which said transducing means are pivotable, including
    means for pivoting one of said transducing means to maintain said one transducing means clear of said cartridge as said cartridge is inserted in said tray means.

6. Apparatus in accordance with claim 1, including a shutter mechanism in said cartridge, and tab means in said tray means for engaging a cartridge as it is inserted in said tray means to open said shutter mechanism in said cartridge.

7. Apparatus in accordance with claim 1, including a rotary actuator for each of said transducing means,
each said rotary actuator including a pair of cylindrical magnets and an armature coil positioned in the magnetic flux path of said magnets, said armature coil being connected to said transducing means to position said transducing means at different radial positions on the surfaces of said disk.

8. Apparatus in accordance with claim 1, including guide openings in said cartridge, and locating pins in said drive for engaging said openings in said cartridge when mounted in said device to accurately position said cartridge therein.

* * * * *